US00RE45158E

(19) United States
(12) Reissued Patent
Emilsson

(10) Patent Number: US RE45,158 E
(45) Date of Reissued Patent: Sep. 23, 2014

(54) CONTROL SYSTEM FOR A WHEELCHAIR HAVING MOVABLE PARTS

(71) Applicant: Permobil AB, Timra (SE)

(72) Inventor: Patrik Emilsson, Nashville, TN (US)

(73) Assignee: Permobil AB, Timra (SE)

(21) Appl. No.: 14/104,978

(22) Filed: Dec. 12, 2013

Related U.S. Patent Documents

Reissue of:
(64) Patent No.: 8,078,365
Issued: Dec. 13, 2011
Appl. No.: 12/441,669
PCT Filed: Sep. 18, 2007
PCT No.: PCT/SE2007/000816
§ 371 (c)(1),
(2), (4) Date: Sep. 8, 2009
PCT Pub. No.: WO2008/036017
PCT Pub. Date: Mar. 27, 2008

(30) Foreign Application Priority Data

Sep. 19, 2006 (SE) ..... 0601930

(51) Int. Cl.
*A61G 5/04* (2013.01)

(52) U.S. Cl.
USPC ..... 701/49; 180/907

(58) Field of Classification Search
USPC ..... 701/49
See application file for complete search history.

(56) References Cited

U.S. PATENT DOCUMENTS

| | | | | |
|---|---|---|---|---|
| 5,121,806 | A * | 6/1992 | Johnson | 180/65.51 |
| 5,642,302 | A | 6/1997 | Dumont et al. | |
| 6,032,976 | A * | 3/2000 | Dickie et al. | 280/650 |
| 6,202,773 | B1 * | 3/2001 | Richey et al. | 180/6.5 |
| 6,443,252 | B1 * | 9/2002 | Andes | 180/65.1 |
| 6,484,829 | B1 * | 11/2002 | Cox | 180/8.1 |
| 6,615,937 | B2 * | 9/2003 | Richey et al. | 180/6.5 |
| 7,360,781 | B2 * | 4/2008 | Schreiber et al. | 280/250.1 |
| 2001/0005073 | A1 * | 6/2001 | Choi et al. | 280/647 |
| 2001/0006125 | A1 * | 7/2001 | Richey et al. | 180/6.5 |
| 2004/0094936 | A1 * | 5/2004 | Koerlin | 280/650 |
| 2006/0087103 | A1 * | 4/2006 | Schreiber et al. | 280/649 |

FOREIGN PATENT DOCUMENTS

| | | |
|---|---|---|
| DE | 19947372 | 4/2001 |
| WO | 03/034967 | 5/2003 |
| WO | WO 03 037673 | 5/2003 |

* cited by examiner

*Primary Examiner* — Shelley Chen
(74) *Attorney, Agent, or Firm* — Wilmer Cutler Pickering Hale and Dorr LLP

(57) ABSTRACT

The invention relates to a control system for controlling a wheelchair having movable parts. The control system comprises a controller and a number of actuators for effectuating movements of the movable parts. The controller comprises a mathematical model of the kinematics of the movable parts and their respective at least one actuator, means for receiving an input signal from one or more of the actuators, and means for setting, based on the mathematical model, limiting positions of the actuators in response to the determined input signal. The invention also relates to a corresponding wheelchair and method of controlling a wheelchair.

42 Claims, 8 Drawing Sheets

CONTROL SYSTEM FOR A WHEELCHAIR HAVING MOVABLE PARTS

Matter enclosed in heavy brackets [ ] appears in the original patent but forms no part of this reissue specification; matter printed in italics indicates the additions made by reissue.

FIELD OF THE INVENTION

The present invention is related to the field of control systems and in particular to a control system for controlling a wheelchair as claimed in claim 1, and to a corresponding wheelchair and method as claimed in claims 15 and 18 respectively.

BACKGROUND OF THE INVENTION

Many modern wheelchairs are electrically driven and it is desirable to provide them with as high maneuverability and comfort as possible. Convenient adjustment of the movable parts of a wheelchair provides a high degree of comfort for the user. The movable parts should be easy to adjust and in particular so as to suit a user's specific needs. However, as safety aspects are most important the safety of the user should not in any way be put at risk by the desire to obtain high maneuverability and comfort.

SUMMARY OF THE INVENTION

A typical prior art wheelchair comprises a number of actuators for setting the different movable parts of the wheelchair in such a way as to provide the most comfortable seating for that particular user. A number of electrical switches, such as micro switches, are typically arranged to restrict the movements of the movable parts of the wheelchair beyond an end point. The micro switches are actuated by the movable parts to thereby stop their movements.

An actuator in the seat of the wheelchair can normally be moved from one end position to another end position, i.e. between two restricting limiting positions. Likewise, an actuator of the backrest of the wheelchair moves the backrest between a first end position and a second end position. The end position of a first movable part of the wheelchair is determined and set disregarding the end positions of other movable parts of the wheelchair. For example, the limiting position of the seat is set without any consideration taken to the limiting position of the backrest. The end positions of the different parts are thus static.

However, a certain end position of the backrest may not be the most optimal one at all times and under all circumstances. For example, if the seat is moved forward then the optimal end position of the backrest could, for that particular user, be another than the provided end position. The optimal end position for that particular user could be a position that ensures a certain angle between the seat and backrest to be maintained at all times. The static end positions may not provide this angle for all possible settings. The optimal end position of the backrest could, during such conditions, therefore actually be a less reclined position than the end position provided by the micro switch.

Further, there are also safety issues to consider when setting the end positions of an actuator. For example, it may de dangerous for the user to allow the backrest to be reclined all the way to its end position when driving the wheelchair at a certain speed. The maximally allowed inclination, i.e. when the actuator reaches its end position, should then for that particular speed be arranged differently than the actually provided static end position.

In view of the above, it would be desirable to address the problems related to the settings of a wheelchair, as well as the safety issues thereof in particular, it would be desirable to provide a control system and method for controlling the settings of a wheelchair without compromising the safety of the user.

It is an object of the invention to provide an improved control system-for controlling the movement of various movable wheelchair parts, for overcoming or at least alleviating shortcomings of the prior art. In particular, it is an object of the invention to enable a dynamical change of the settings of a wheelchair in dependence on the current circumstances and in consideration of the limiting positions of other movable parts of the wheelchair.

It is another object of the invention to provide an improved control system in which the safety of the user is not put at risk and in which most comfortable settings are provided.

It is yet another object of the invention to provide an improved control system enabling a convenient customizing of the settings of the wheelchair so as to suit a user's specific needs. Further, the customizing is enabled in a simple manner and the movable parts are easily adjusted.

These objects, among others, are achieved by a control system as claimed in claim 1, by a wheelchair as claimed in claim 15 and by a method as claimed in claim 18.

In accordance with the invention a control system for controlling a wheelchair having movable parts is provided. The control system comprises a controller and a number of actuators for effectuating movements of the wheelchair's movable parts. The controller comprises a mathematical model of the kinematics of the movable parts and their respective at least one actuator, means for receiving an input signal from one or more of the actuators, and means for setting, based on the mathematical model, limiting positions of the actuators in response to the determined input signal. By means of the invention an arbitrary number of input signals can be combined with an arbitrary number of output signals in an arbitrary way. Further, the output signals may be associated with an arbitrary number of restrictions. A very flexible control system is thereby provided. The inventive control system thus comprises a controller that controls the movements of actuators of a wheelchair based on a mathematical model, whereby dynamical alteration of limiting positions of the actuators is enabled. The control system in accordance with the invention provides a control system, in which the settings are easily adapted for different users.

In accordance with an embodiment of the invention, the actuators of the control system are located at joints of the wheelchair. The actuators further comprise electronic circuitry for receiving commands from the controller, whereby setting of a dynamically alterable limiting position is enabled.

The invention also relates to a wheelchair comprising the control system and a method for controlling a wheelchair, whereby advantages similar to the above are achieved.

Further characteristics of the invention and advantages thereof will be evident from the detailed description of a preferred embodiment of the present invention given hereinafter and the accompanying figures, which are only given by way of illustration, and thus are not limitative of the present invention.

DETAILED DESCRIPTION OF PREFERRED EMBODIMENTS

Figure 1:
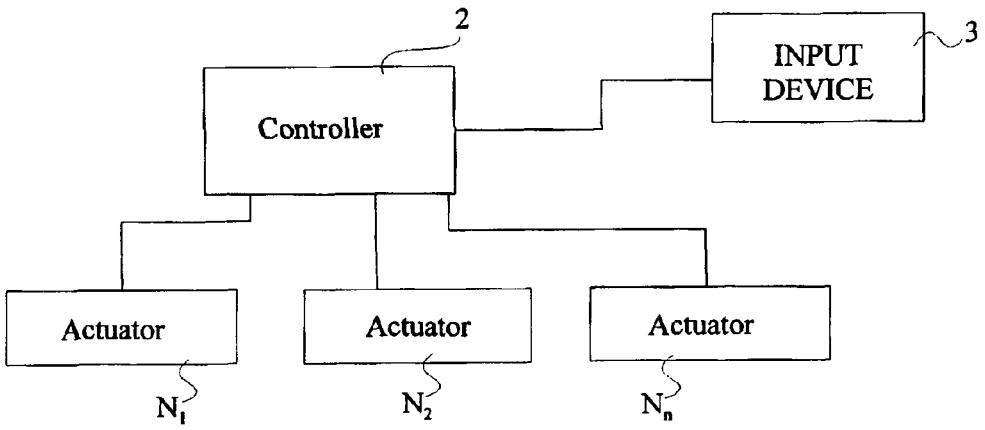
FIG. 1 is a schematic illustration of a control system in accordance with the invention, for controlling a wheelchair.

FIG. 1 illustrates schematically an electronic control system in accordance with the invention for controlling a wheelchair. The control system 1 comprises a master module, in the following termed a controller 2, for controlling a wheelchair in which the control system 1 is installed. The controller 2 can be any device suitable for controlling the wheelchair. In particular, any device capable of controlling the transfer of data to and from a number of nodes connected to it may be utilized. The controller 2 should be capable of receiving inputs from sensors and able to output signals to various actuators for moving movable parts of the wheelchair.

The control system 1 further comprises a number of actuators $N_1, N_2, \ldots, N_n$ for operating the wheelchair, and more specifically for manipulating movable elements of the wheelchair. The wheelchair comprising the control system 1 is preferably provided with an input means 3, and such input means 3 is then also connected to the controller 2.

Figure 2:
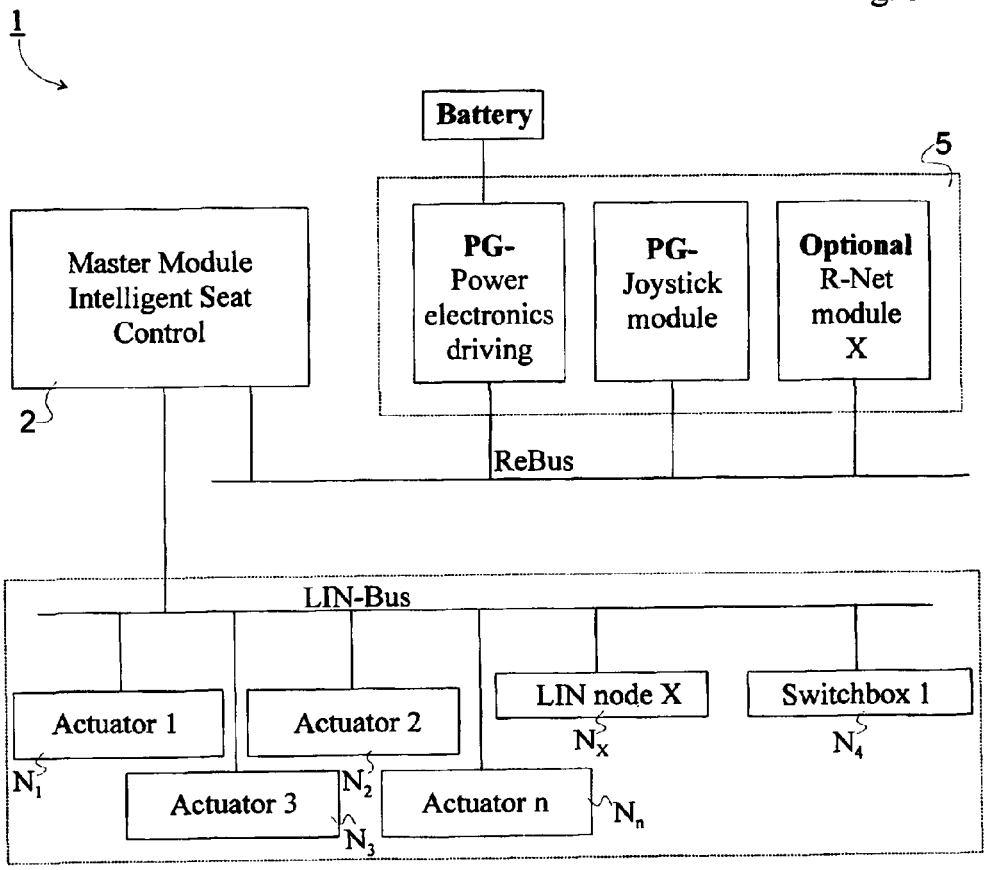
FIG. 2 illustrates art exemplary implementation of the control system in accordance with the invention.

FIG. 2 illustrates an exemplary structure for implementing the physical structure of the electronic control system 1 of FIG. 1. The controller 2 and the actuators $N_2, \ldots, N_n$ of the control system 1 may be implemented by means of a LIN (Local Interconnect Network). However, other means for enabling communication between the controller and the actuators of the control system are conceivable, and in particular other serial communication buses than LIN-buses may alternatively be used.

A LIN-bus is illustrated schematically at 4, comprising a number of nodes $N_1, N_2, N_3, N_4, N_x, \ldots, N_n$, where n may be any number up to 16. It is conceivable to add even further nodes, i.e. more than 16; the number of possible nodes is dependent on, among other things, how the impedance within the network changes when adding further nodes. Briefly, a LIN bus is a relatively slow communication bus comprising one master module and a number of slave modules, in the following denoted nodes. The LIN-bus may be used for integrating intelligent sensor devices and/or actuators of an electrically powered vehicle, such as a wheelchair, LIN thus enables a cost-effective communication for smart sensors and actuators, in particular where the bandwidth and versatility of CAN (Controller Area Network) is not required.

As mentioned earlier, the control system 1 comprises a number, of actuators $N_1, N_2, N_3, N_4, N_x, \ldots, N_n$ for manipulating the movable parts of the wheelchair. Examples of the movable parts comprise a seat, a backrest, a headrest, an armrest, a leg rest and a footrest. However, even further movable parts are conceivable. An exemplary wheelchair is shown in FIG. 3.

The nodes $N_1, N_2, N_3, N_4, N_x, \ldots, N_n$, may comprise any kind of actuator, i.e. any device imparting mechanical motion over restricted linear or rotary change. The actuators are located in connection with the movable parts of the wheelchair for effectuating desired movements of the movable parts. Another node may be a switchbox or a user interface. The LIN-bus 4 may, for example, be implemented with three wires: two wires for power distribution and one wire for effectuating communication between the nodes. However, other implementations are conceivable.

The control system 1 may further be adaptable for interconnection to any additional bus system, such as existing bus systems available on the market. For example, the inventive control system could be adapted for integration with the bus system ReBus manufactured by PG Drives Technology. Input devices provided by PG Drives Technology could then be used for controlling the actuators and also for presenting status information of the control system 1 as well as other information. An exemplary optional bus system. ReBus, is indicated at 5. Further, a power source such as a battery 6 is also included for powering drive wheel motors, actuators and other parts requiring electrical power.

Figure 3:
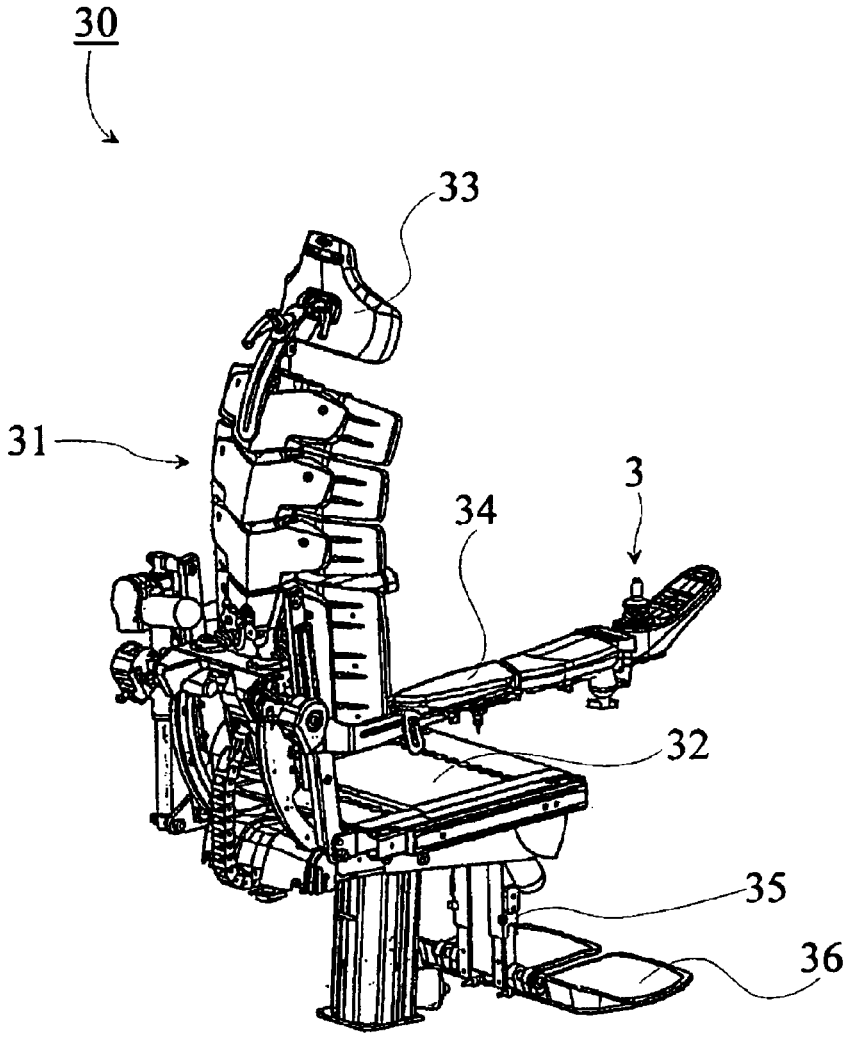
FIG. 3 illustrates a wheelchair in accordance with the invention comprising the control system of FIG. 1.

FIG. 3 illustrates a wheelchair comprising the innovative control system 1. The figure illustrates only the chair unit of the wheelchair. It is realised that the wheelchair further comprises a chassis and wheels. That is, the illustrated chair unit is intended to be mounted on such chassis, preferably a motorized wheelchair base. The wheelchair 30 comprises a number of movable parts, such as for example a backrest 31, a seat 32, a head rest 33, arm rests 34, leg rests 35 and foot rests 36. The movable parts are preferably independently movable by means of corresponding actuators. The actuators of the wheelchair 30, for example actuators positioned so as to move or tilt the seat frame, comprises sensors or other means for providing an indication of the position of the actuator in relation to a reference point. Other actuators are arranged to pivot the leg rests with respect to the seat frame. It is realized that the wheelchair 30, although not described, comprises even further actuators for effectuating movement of its various movable parts. Any known electrically powered actuator may be used.

The actuators of the wheelchair 30 comprising the innovative control system comprise electronic circuitry for enabling the dynamic setting of limiting positions. In contrast to prior art, in which micro switches are arranged to stop the movement of an actuator at a certain static end point, each actuator in accordance with the invention is itself provided with electronic circuitry that enables a dynamically alterable end position to be set. In accordance with the invention, the controller 2 calculates dynamically the desired end position for each actuator and controls so that it will not be exceeded.

The wheelchair 30 further comprises an input means 3 (also illustrated in FIG. 1). Such an input device 3 is then connected to the controller 2. A user may thereby, in a conventional manner, input commands by means of the input device. The input means 3 may be any conventional input device, such as a joystick, a keypad, touchpad or the like. The input means may further comprise a display for displaying information to the user.

A mathematical model was developed with the mechanical design and drawings of a wheelchair as the starting point, and this mathematical model is an important part in the development of the present invention. The structure of a wheelchair was defined by a number of points. The joint coupling points of the wheelchair, at which points actuators are usually placed, were located and defined. The mechanical relationships between and the kinematics of the different parts were then translated into mathematical functions. A complete mathematical model is given later in the description as an example.

Figure 4:
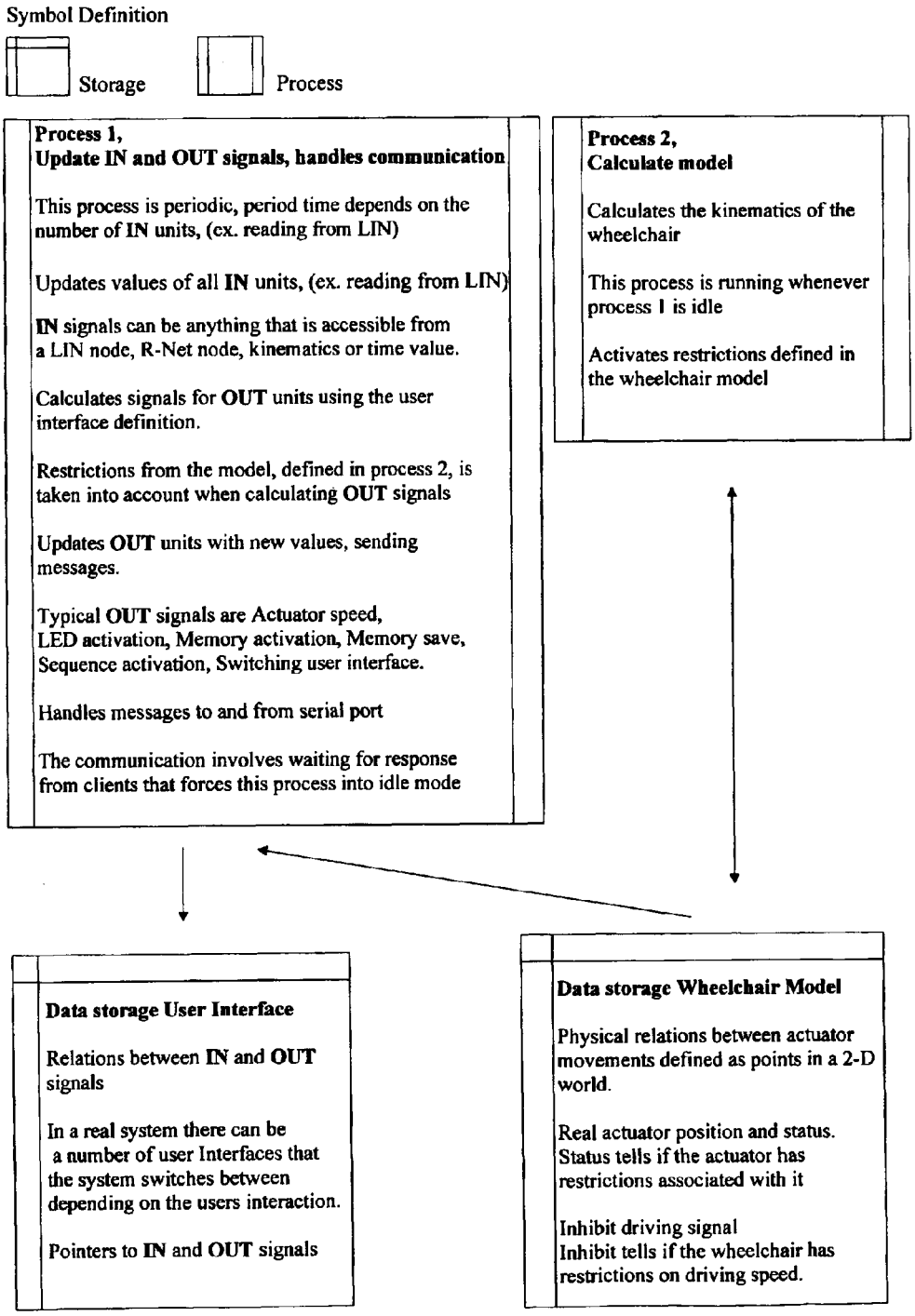
FIG. 4 illustrates schematically a program structure of a control program for the control system in accordance with the present invention.

The present invention further provides a control program for implementing the intelligent control system described above. FIG. 4 illustrates an exemplary software structure of the control program suitable for use in the control system in accordance with the invention. The upper left-hand square illustrates a first process P1 executed within the controller 2. This process P1 handles the communication between the controller 2 and the nodes $N_1, N_2, \ldots, N_n$ and updates input signals and output signals. The process P1 preferably runs periodically, wherein the period time depends on the number of input devices that needs to be updated. In process P1 values of all input devices are updated, for example by reading from the LIN. The input signals can be anything that is accessible for example from a LIN-node, an R-Net node, kinematics or timer value.

The process P1 further calculates signals for output units using the user interface definition.

In the process P1, restrictions from the mathematical model (as defined in process 2, shown in the upper right-hand square of the figure) are taken into account when output signals are calculated.

The process P1 further updates output units with new, updated values by sending messages. Typical output signals comprise actuator speed, LED (light emitting diode) activation, memory activation, memory save, sequence activation, switching user interface.

The process P1 further handles messages to and from serial ports, wherein the communication involves waiting for response from clients that forces this process P1 into an idle mode.

Whenever process P1 is idle, a second process P2, illustrated in the upper right-hand square of the figure, is activated. The second process P2 calculates the kinematics of the wheelchair based on the mathematical model and activates restrictions defined for that particular wheelchair model. The mathematical model may comprise restrictions so as to provide the most ergonomically correct posture and most comfortable seating for the user of the wheelchair. This second process P2 is running whenever the first process P1 is idle.

In the lower left-hand square first data storage means for the user interface is illustrated. In this first storage means the relations between input and output signals are stored. There can be several different user interfaces that the system switches between in dependence on the users interaction. The first storage means further comprises pointers to input and output signals.

In the lower right-hand square, second data storage means for storing data relating to different wheelchair models is illustrated. This second data storage means comprises physical relations between actuator movements defined as points in a 2-dimensional space. The second data storage means further comprises the actual position and status of the wheelchair actuators. Position information may for example be provided to the controller by means of sensors placed in connection with the actuators. The status information may disclose whether the actuator has restrictions associated with it. The second data storage means also provides information to the first process P1 for inhibiting a driving signal, for example informing the first process P1 about any restrictions on the driving speed of the wheelchair that may exist.

Figure 5A:
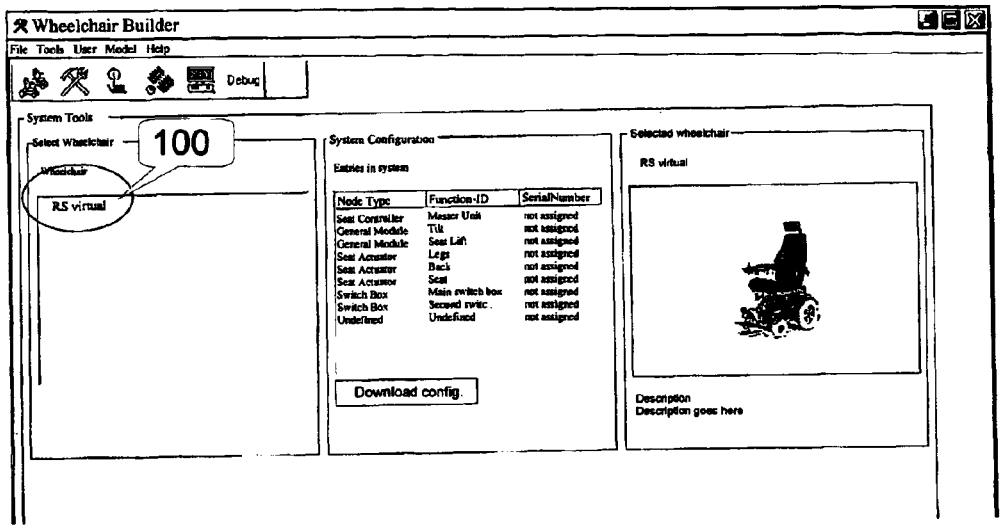
FIGS. 5a and 5b illustrate exemplary screen shots of a control program suitable for a control system in accordance with the invention.
Figure 5B:
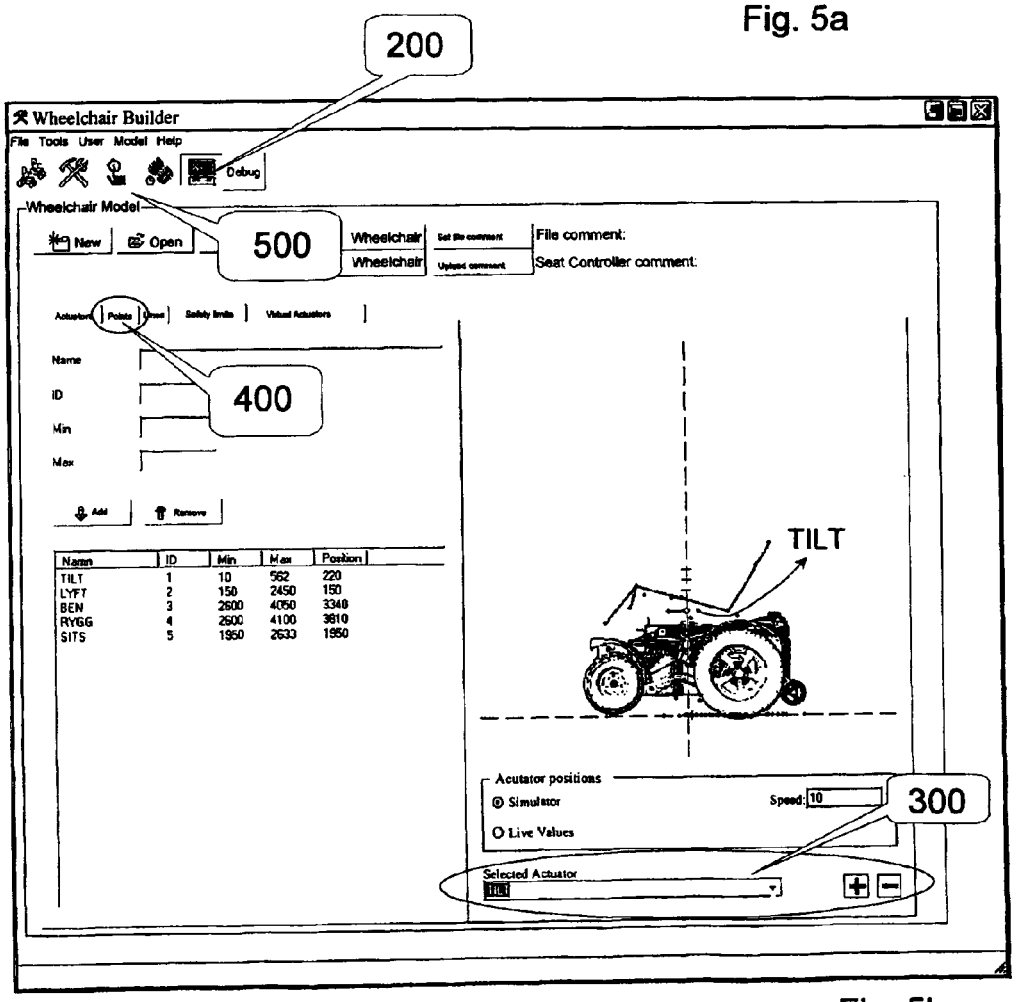

FIGS. 5a and 5b are exemplary screen shots of a user interface for the control program in accordance with the invention. At 100 in FIG. 5a a desired wheelchair type is chosen. In the exemplary view only one model is shown, RS virtual, but it is realised that any number of different wheelchair models may be listed and chosen between. At 200 in FIG. 5b the model view is chosen, which view is the one shown in the screen shot of FIG. 5b. In the screen shot of FIG. 5b the names of different actuators are shown, in this example the actuators are named TILT, LYFT, BEN, RYGG, SITS for a tilt controlling actuator, a lift controlling actuator, a footrest controlling actuator, backrest controlling actuator, and seat controlling actuator, respectively. Further, their corresponding IDs are shown, as is their corresponding set minimum and maximum values and current position. At 300 one of a number of different actuators of the simulator can be chosen. In the figure above the chosen actuator, which in the illustrated example is the tilt-function, the movements of the actuators are shown. At 400 one of five exemplary tabs is encircled, "Points". Below this tab (shown in FIG. 6 and described more in detail in connection thereto) the formulas constituting the mathematical model of the inventive control system can be investigated, as can their current values.

Figure 6:
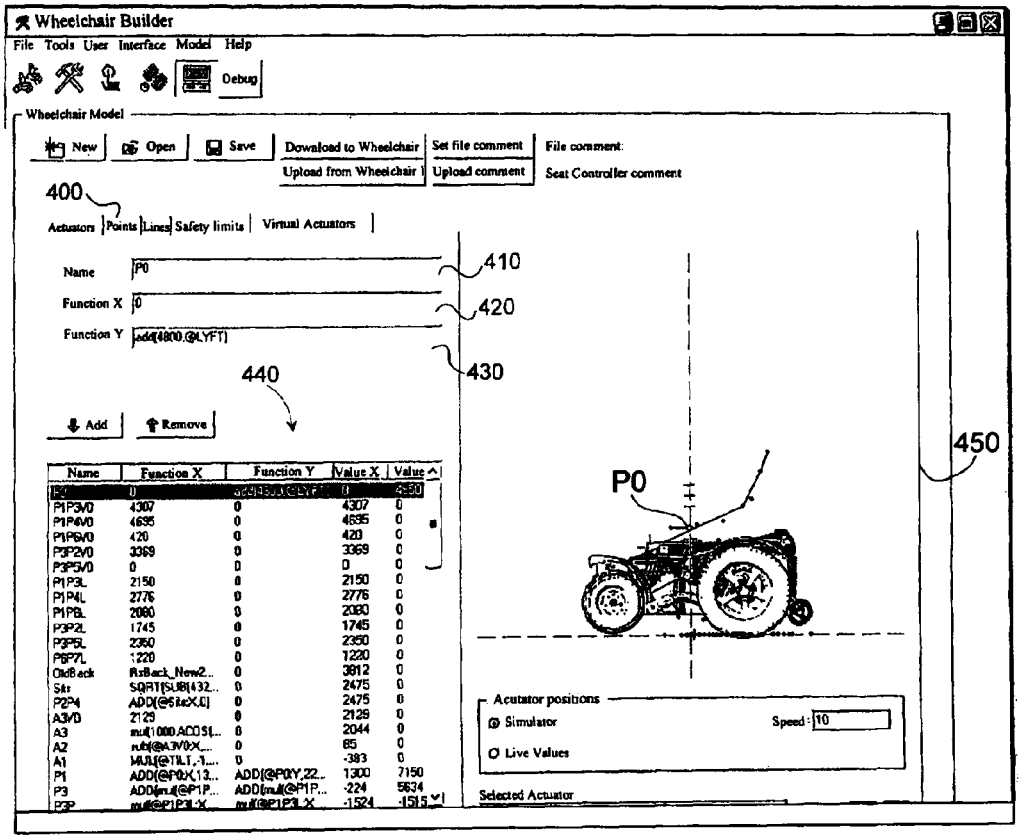
FIG. 6 is another exemplary screen shot of the control program in accordance with the invention.

FIG. 6 is an exemplary screen shot shown behind tab 400 of 5b. This screen shot displays at 440 the mathematical functions constituting the mathematical model. The different points constituting the mathematical model are named in any suitable manner. At 410 the name of a point, P0, marked in box 440 is shown. At 420 and 430 an expression for the position of the point is shown. More specifically, at 420 a function for the x-coordinate is shown, and at 430 a function for the y-coordinate is shown. Examples of available functions include: add(x,y), sub(x,y), mul(x,y), div(x,y), pow(x, y), sqrt(x), sin(x), cos(x), tan(x), a sin(x), a cos(x) and a tan(x). That is, addition, subtraction, multiplication, division, power, square root, sine, cosine, tangent, arc sin, arc cos and arc tan, respectively. Other mathematical functions could be used as well.

In the exemplary wheelchair shown in box 450 only one point P0 is shown, but as is evident there are a number of points for describing the structure of the wheelchair.

In table 1 below exemplary functions are listed for points P0 and P1:

TABLE 1

| Name | Function X | Function Y |
|---|---|---|
| P0 | 0 | add(4800, @LYFT) |
| P1 | add(@P0: X, 1300) | add(@P0: Y, 2200) |

A complete mathematical model for an exemplary wheelchair is given in the following:

[actuators]

TILT;10;562;1
LYFT;150;2450;2
BEN;2600;4050;3

-continued

```
RYGG;2600;4100;4
SITS;1950;2633;5
[virtual actuator]

VSeatAngle;−400;0;2;57;0
[virtual functions]

0;−1;60;0;
−1;2;58;0;
[virtual actuator]

VBackAngle;1000;1500;3;56;0
[virtual functions]

3;−1;59;0;
0;−1;60;0;
[virtual actuator]

VSeatHeight;5000;10000;4;58;0
[virtual functions]

1;−1;61;0;
[points]

P0;0;add(4800,@LYFT)
P1P3V0;4307;0
P1P4V0;4695;0
P1P6V0;420;0
P3P2V0;3369;0
P3P5V0;0;0
P1P3L;2150;0
P1P4L;2776;0
P1P6L;2080;0
P3P2L;1745;0
P3P5L;2350;0
P6P7L;1220;0
OldBack;RsBack__New2Old(@RYGG);0
Sits;SQRT(SUB(4324186.0,MUL(-
3947190.0,COS(MUL(0.001745329,SUB(1020.9,MUL(572.9578,ACOS(DIV(SUB(ADD(15523600.0
5522500.0),POW(SUB(@OldBack:X,1219.6),2)),18518000.0))))))))));0
P2P4;ADD(@Sits:X,0);0
A3V0;2129;0
A3;mul(1000,ACOS(DIV(SUB(4324186.0,MUL(@P2P4:X,@P2P4:X)),3947190.0)));0
A2;sub(@,A3V0:X,@A3:X);0
A1;MUL(@TILT,−1.745);0
P1;ADD(@P0:X,1300);ADD(@P0:Y,2200)
P3;ADD(mul(@P1P3L:X,cos(DIV(add(@P1P3V0:X,@A1:X),1000)))),@P1:X);ADD(mul(@P1
P3L:X,sin(DIV(add(@P1P3V0:X,@A1:X),1000)))),@P1:Y)
P3P;mul(@P1P3L:X,cos(DIV(add(@P1P3V0:X,@A1:X),1000)));mul(@P1P3L:X,sin(DIV
(add(@P1P3V0:X,@A1:X),1000))))
P4;ADD(mul(@P1P4L:X,cos(DIV(ADD(@P1P4V0:X,@A1:X),1000)))),@P1:X);ADD(mul(@P1
P4L:X,sin(DIV(ADD(@P1P4V0:X,@A1:X),1000)))),@P1:Y)
P6;ADD(mul(@P1P6L:X,cos(DIV(ADD(@P1P6V0:X,@A1:X),1000)))),@P1:X);ADD(mul(@P1
P6 L:X,sin(DIV(ADD(@P1P6V0:X,@A1:X),1000)))),@P1:Y)
P2P;ADD(@P3:X,SUB(MUL(mul(@P3P2L:X,cos(DIV(ADD(@P3P2V0:X,@A2:X),1000)))),COS
(DIV(@A1:X,1000))),MUL(mul(@P3P2L:X,sin(DIV(ADD(@P3P2V0:X,@A2:X),1000)))),
SIN(DIV(@A1:X,1000)))))ADD(@P3:Y,ADD(MUL(mul(@P3P2L:X,cos(DIV(ADD(@P3P2V0:
X,@A2:X),1000)))),SIN(DIV(@A1:X,1000))),MUL(mul(@P3P2L:X,sin(DIV(ADD(@P3P2V0:
X,@A2:X),1000)))),COS(DIV(@A1:X,1000)))))
P5P;ADD(@P3:X,SUB(MUL(mul(@P3P5L:X,cos(DIV(ADD(@P3P5V0:X,(@A2:X),1000)))),COS
(DIV(@A1:X,1000))),MUL(mul(@P3P5L:X,sin(DIV(ADD(@P3P5V0:X,@A2:X),1000)))),
SIN(DIV(@A1:X,1000)))));ADD(@P3:Y,ADD(MUL(mul(@P3P5L:X,cos(DIV(ADD(@P3P5V0:
X,@A2:X),1000)))),SIN(DIV(@A1:X,1000))),MUL(mul(@P3P5L:X,sin(DIV(ADD(@P3P5V0:
X,@A2:X),1000)))),COS(DIV(@A1:X,1000)))))
P5P6DL;SUB(@P6:X,@P5P:X);SUB(@P6:Y,@P5P:Y)
P7;ADD(@P6:X,MUL(DIV(@P5P6DL:X,SQRT(ADD(MUL(@P5P6DL:X,@P5P6DL:X),MUL(@P5P6DL:
Y,@P5P6DL:Y)))),@P6P7L:X));ADD(@P6:Y,MUL(DIV(@P5P6DL:Y,SQRT(ADD(MUL(@P5P6
DL:X,@P5P6DL:X),MUL(@P5P6DL:Y,@P5P6DL:Y)))),@P6P7L:X))
RD;sqrt(ADD(pow(sub(@P7:X,@P5P:X),2),POW(SUB(@P7:Y,@P5P:Y),2)));−20
RY;SUB(ADD(0,@,OldBack:X),@RD:X);0
P2P4L;sqrt(add(pow(sub(@P2P:x,@P4:x),2),pow(sub(@P2P:y,@P4:y),2)));−10
ON;1;0
tilt;−500;sub(@P2P:Y,@P5P:Y)
P3P2;1745;0
P3P10;1076;0
P2P10;2705;0
P3P8;2207;0
P3P5;2350;0
P5P8;4556;0
```

-continued

```
P8P10;3245;0
P8P11;1100;0
P8P9;2327;0
P9P11;1387;0
VP3HPP2;MUL(572.957,ASIN(DIV(SUB(@P3:Y,@P2P:Y),@P3P2:X)));0
VP3HPP5;MUL(572.957,ASIN(DIV(SUB(@P3:Y,@P5P:Y),@P3P5:X)));0
VP3P2 P10;MUL(572.957,ACOS(DIV(SUB(ADD(POW(@P3P2:X,2.0),POW(@P3P10:X,2.0)),POW
(@P2P10:X,2.0)),MUL(MUL(2.0,@,P3P10:X),@P3P2:X))));0
VP3HPP8;MUL(572.957,ACOS(DIV(2205,2207)));0
VP3P5P8;MUL(572.957,3.099672063);0
P10;SUB(@P3:X,MUL(@P3P10:X,COS(MUL(0.001745329,ADD(@VP3P2P10:X,@VP3HPP2:X)))));
SUB(@P3:Y,MUL(@P3P10:X,SIN(MUL(0.001745329,ADD(@VP3P2P10:X,@VP3HPP2:X)))))
P8;ADD(@P3:X,MUL(@P3P8:X,COS(MUL(0.001745329,ADD(@VP3P5P8:X,@VP3HPP5:X)))))
SUB(@P3:Y,MUL(@P3P8:X,SIN(MUL(0.001745329,ADD(@VP3P5P8:X,@VP3HPP5:X)))));
VP8HPP10;MUL(572.957,ASIN(DIV(SUB(@P8:Y,@P10:Y),@P8P10:X)));0
VP8P10P11;MUL(572.957,ACOS(DIV(SUB(ADD(POW(@P8P10:X,2.0),POW(@P8P11:X,2.0)),
POW(@BEN,2.0)),MUL(MUL(2.0,@P8P10:X),@P8P11:X))));0
P11;ADD(@P8:X,MUL(@P8P11:X,COS(MUL(0.001745329,ADD(@VP8P10P11:X,@VP8HPP10;
X)))));SUB(@P8:Y,MUL(@P8P11:X,SIN(MUL(0.001745329,ADD(@VP8P10P11:X,@VP8HPP10;
X)))))
VP8HPP11;MUL(572.957,ATAN2(SUB(@P8:Y,@P11:Y),SUB(@P11:X,@P8:X)));0
VP8P11P9;MUL(572.957,ACOS(DIV(SUB(ADD(POW(@P8P9:X,2.0),POW(@P8P11:X,2.0)),POW
(@P9P11:X,2,0)),MUL(MUL(2.0,@P8P9:X),P8P11:X))));0
P9;ADD(@P8:X,MUL(@P8P9:X,COS(MUL(0.001745329,ADD(@VP8P11P9:X,@VP8HPP11:X)))));
SUB(@P8:Y,MUL(@P8P9:X,SIN(MUL(0.001745329,ADD(@VP8P11P9:X,@VP8HPP11:X)))))
fBackAngle;SUB(1800,MUL(572.957,ACOS(DIV(SUB(9998736.0,POW(SUB(@OldBack:X,1219.6),
2))),MUL(4700.0,SUB(@OldBack:X,1219.6))))));0
fSeatAngle;ADD(SUB(SUB(491.2,MUL(572.9578,ACOS(DIV(SUB(21043740.0.POW(SUB(@
OldBack:X,1219.6),2)),18516590.0)))),@TILT),−13);@OldBack:X
fSeatHeight;ADD(ADD(@LYFT,4800),SUB(2220.0,MUL(2150.0,COS(MUL(0.001745329,ADD
(@TILT,210.0))))));0
fBack;RsBack_Old2New(ADD(MUL(ADD(MUL(4700.0,COS(MUL(0.001745,@VBackAngle))),
SQRT(ADD(POW(MUL(4700.0,COS(MUL(0.001745,@VBackAngle))),2),39994944.0))),0.5),1219.6));0
fTilt;ADD(SUB(SUB(491.2,MUL(572.9578,ACOS(DIV(SUB(21043740.0,POW(SUB(RsBack
_New 2Old(@fBack:X),1219.6),2)),18516590.0)))),@VSeatAngle),−13);0
fSeatLift;SUB(SUB(@VSeatHeight,4800),SUB(2220.0,MUL(2150.0,COS(MUL(0.001745329,
ADD(@fTilt:X,210.0))))));0
P12;SUB(@P0:X,828);ADD(@P0:Y,0)
P12P3;SUB(@P3:X,@P12:X);SUB(@P3:Y,@P12:Y)
VP12VPP3;MUL(572.957,ATAN(DIV(@P12P3:X,@P12P3:Y)));0
LP12SEAT;SUB(MUL(SQRT(ADD(POW(@P12P3:X,2),POW(@P12P3:X,2))),COS(MUL(0.001745329,
ADD(@VP12VPP3:X,@fSeatAngle:X)))),150);0
P12b;SUB(@P12:X,MUL(SIN(MUL(0.001745329,@fSeatAngle:X)),@LP12SEAT:X));ADD(@
P12:Y,MUL(COS(MUL(0.001745329,(@fSeatAngle:X)),@LP12SEAT:X))
fSeat;SQRT(SUB(4324186.0,MUL(3947190.0,COS(ADD(1.328,ASIN(DIV(MUL(SIN(MUL(0.001745,
@VBackAngle)),SUB(@fBack:X,1220.0)),3940.0)))))));0
VP5PHPP13;−118;0
P5PP13L;490;0
P3P13L;2842;0
VP3P5P13;10;0
P13;ADD(@P5P:X,MUL(@P5PP13L:X,COS(MUL(0.001745329,ADD(@VP5PHPP13:X,@fSeatAngle:
X)))));ADD(@P5P:Y,MUL(@P5PP13L:X,SIN(MUL(0.001745329,ADD(@VP5PHPP13:X,@
fSeatAngle:X)))))
[lines]
```

```
P7;P5P
P5P;P8
P8;P9
P11;P8
P0;P12
[delimiters]
```

```
P0;6000;1;1;1
P0;6500;1;1;2
P0;7000;1;1;3
P9;−1800;0;1;1280
P9;−1800;0;1;256
LP12SEAT;150;0;0;256
LP12SEAT;150;0;0;1792
```

In the above program implementing the mathematical model, a number of points are defined, for example:

[actuators]

TILT;10;562;1

That is, an actuator named "TILT", which provides the seat with a tilt-function, has the coordinates (10, 562, 1) in relation to a chosen system of coordinates having the origin of coordinates suitably chosen.

At "[points] P0;0;add(4800, @LYFT)" and onwards the mathematical functions of the model are given.

The defined lines (e.g. [lines] P7;P5P) are lines for providing a visualisation of the movements of the movable parts of the wheelchair. The user is thus provided with a means for visualising the movements in a convenient way.

The defined delimiters comprise safety restrictions and provide backup safety definitions.

Figure 7:
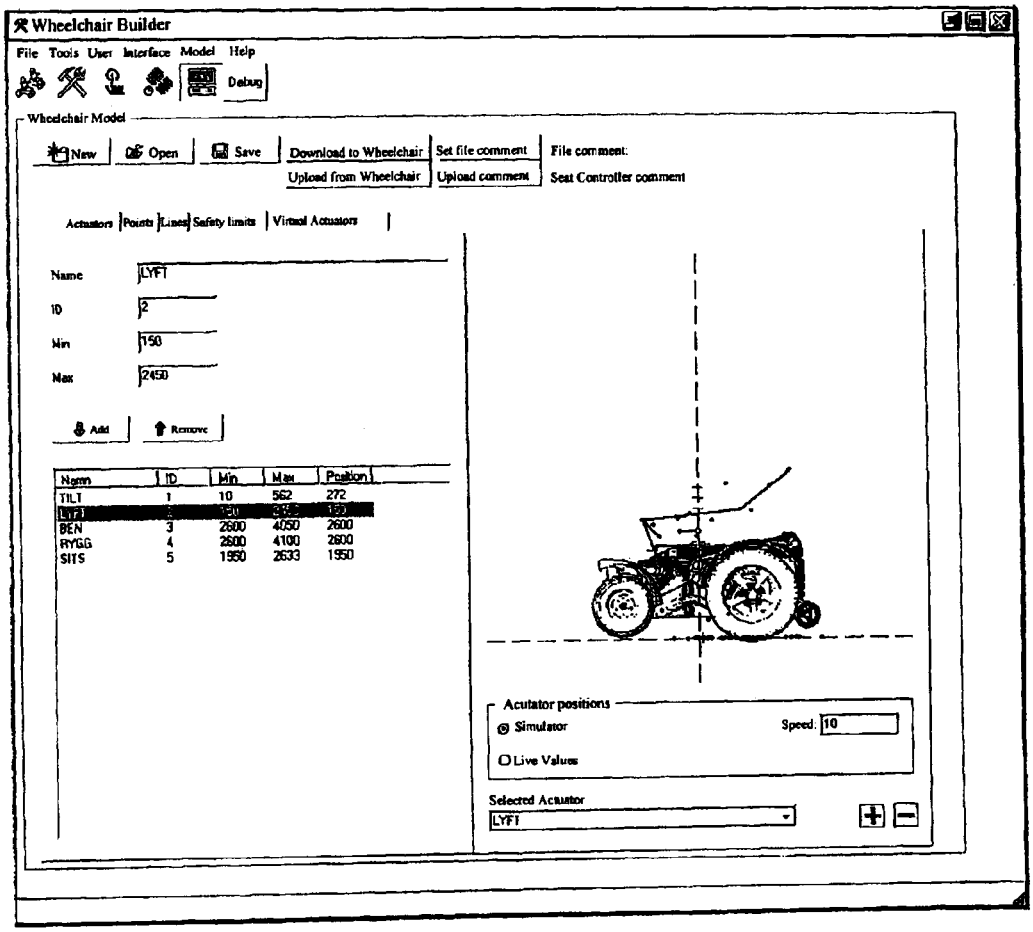
FIG. 7 is yet another exemplary screen shot of the control program in accordance with the invention.

In FIG. 7, which is the screen shot shown below tab "Actuators" of FIG. 5b, a number of actuators are shown.

Examples of such actuators were described in connection with FIG. 5b. Such interface provides an easy way to add nodes, for example actuators, and to reuse actuator definitions of a previous wheelchair model. Actuator definitions, such as name, ID and desired settings, are easily entered into the shown fields. When the set restrictions or delimits of one node is altered, other nodes are generally affected. Should a user try to alter the settings of an actuator in an improper way, an error message may be displayed. If the user is trying to remove an actuator the mathematical functions for which depend on other actuators, an error message may be displayed; for example: "There are point(s)/delimiter(s) that depend on the actuator that you are trying to remove".

Figure 8:
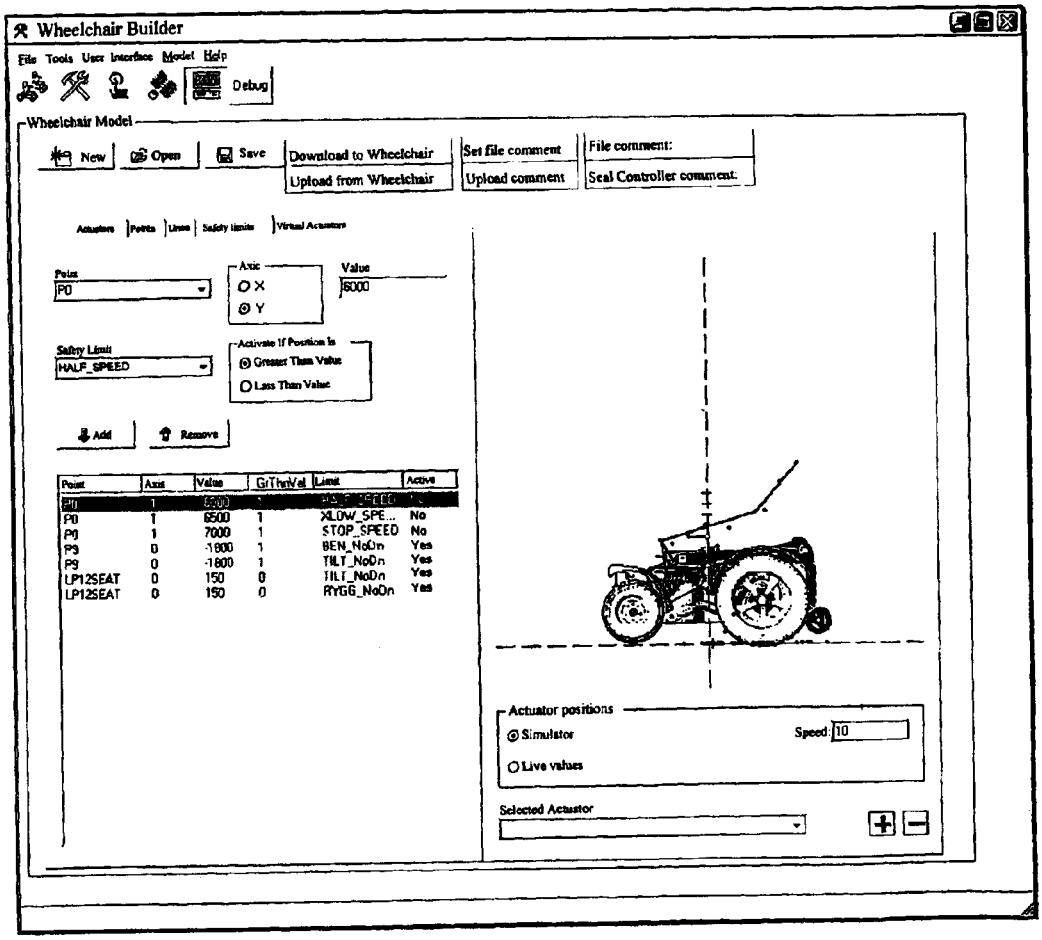
FIG. 8 is still another exemplary screen shot of the control program in accordance with the invention.

FIG. 8 is the screen shot shown below tab "Safety limits" of FIG. 5b. A user is enabled to enter specific safety regulations, for example restricting the speed of the wheelchair during certain circumstances. For example, there could be a safety limit limiting the maximum speed of the wheelchair if the backrest is reclined a certain angle, or there may be a safety limit bringing the wheelchair to a full stop during some other circumstances.

Figure 9:
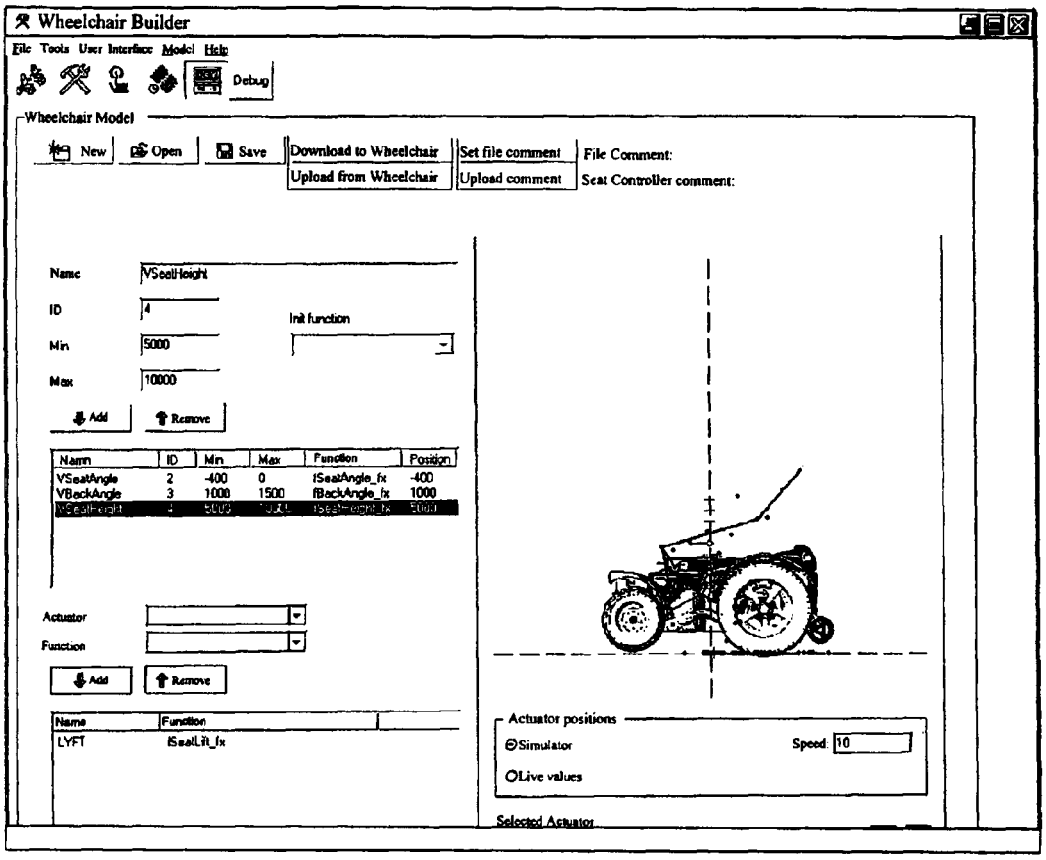
FIG. 9 yet another exemplary screen shot of the control program in accordance with the invention.

FIG. 9 is the screen show shown below tab "Virtual Actuators" of FIG. 5b. In accordance with the invention, it is possible to control a desired physical parameter. For example, the angle of the back may be a crucial parameter for some users, which angle then has to be restricted to a certain value. A "virtual" actuator VBackAngle can be defined to have a minimum value of 1000 and a maximum value of 1500, which would translate to an angle in the range of 100° to 150° of the back seat with a vertical line as reference. Based on this, mathematical functions can be defined for the movements of, for example, a backrest actuator and tilt actuators. In particular, the adjustments to the desired values of the backrest actuator and the tilt actuator are made in dependence on the "virtual" actuator VBackAngle, that is, are adjusted so as to fulfill the value of VBackAngle.

The settings of the wheelchair may be set in dependence on the weight of the user. When the user seats oneself in the wheelchair, a sensor in the seat of the wheelchair conveys the weight of the user to the controller 2. The controller 2 then calculates the limiting positions of the actuators $N_1, N_2, \ldots, N_n$ applicable for the input weight. The movable parts of the wheelchair are then controlled in dependence thereon.

Figure 10:
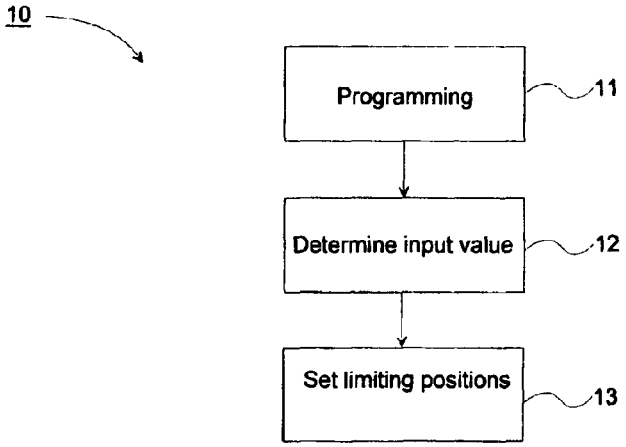
FIG. 10 is a flow chart over steps of a method for controlling a wheelchair in accordance with the invention.

FIG. 10 shows a flow chart of the method in accordance with the invention. The method 10 is intended for use in controlling a wheelchair having a number of movable parts and a number of actuators located in connection with and enabling movement of the movable parts. The wheelchair further comprises a controller for controlling movements of the actuators. The method 10 comprises firstly the step of programming the controller of the wheelchair with a mathematical model of the kinematics of the movable parts and their respective at least one actuator (step 11). At step 12 an input value of one or more of the actuators is determined. At step 13 limiting positions of the actuators are set in response to the determined one or more input values.

The controller comprises a computer program for controlling movable parts of a wheelchair. The computer program comprises computer readable program code elements which when run in the controller causes the controller to perform the above-described method 10. The computer program may be stored in any suitable memory device, such as ROM (Read Only Memory), PROM (Programmable ROM), EPROM (Erasable ROM), EEPROM (Electrically Erasable PROM), flash memory, SRAM (Static Random Access Memory) etc.

In summary, the present invention provides an intelligent control system for wheelchair control. In accordance with the invention, an arbitrary number of input signals can be combined with an arbitrary number of output signals in an arbitrary way. Further, the output signals may be associated with an arbitrary number of restrictions. A very flexible control system is hence provided. The inventive control system thus comprises a controller that controls the movements of actuators of a wheelchair based on a mathematical model, whereby dynamical alteration of limiting positions of the actuators is enabled.

While the present invention has been described in various embodiments it shall be appreciated that the invention is not limited to the specific features and details set forth, but is defined only by the appended patent claims.

The invention claimed is:

1. Control system for controlling a wheelchair having movable parts, said control system comprising a controller and a number of actuators for effectuating movements of said movable parts characterised in that said controller (2) comprises a mathematical model of the kinematics of said movable parts (31, 32, 33, 34, 35, 36) and a respective at least one actuator ($N_1, N_2, \ldots, N_n$), said mathematical model being based on defining a structure of said wheelchair by a number of points, said number of points comprising locations of joint coupling points of said wheelchair, wherein mechanical relationships between, and kinematics of, different parts are translated into mathematical functions, said controller (2) comprises means for receiving an input signal from one or more of said actuators ($N_1, N_2, \ldots, N_n$), said controller (2) comprises means for setting, based on said mathematical model, limiting positions of said actuators ($N_1, N_2, \ldots, N_n$) in response to said input signal, enabling dynamical alteration of limiting positions of said actuators.

2. The control system as claimed in claim 1, wherein said actuators ($N_1, N_2, \ldots, N_n$) are located at joins of said wheelchair.

3. The control system as claimed in claim 1, wherein said controller (2) is able to handle an arbitrary number of input signals and an arbitrary number of output signals.

4. The control system as claimed in claim 3, wherein said output signals are associated with an arbitrary number of constraints.

5. The control system as claimed in claim 1, wherein said controller (2) is a master unit of a local interconnect network.

6. The control system as claimed in claim 1, wherein said actuators ($N_1, N_2, \ldots, N_n$) comprise electronic circuitry for receiving commands from said controller (2), thereby setting a dynamically alterable limiting position.

7. The control system as claimed in claim 1, wherein said controller (2) comprises a memory.

8. The control system as claimed in claim 7, wherein said memory comprises a configuration file.

9. The control system as claimed in claim 8, wherein said configuration file comprises safety limits restricting a speed of said wheelchair when a criteria, as determined based on said input signal, is fulfilled.

10. The control system as claimed in claim 1, wherein said control system comprises an additional communication network.

11. The control system as claimed in claim 1, wherein one or more of said actuators ($N_1, N_2, \ldots, N_n$) comprises a sensor.

12. The control system as claimed in claim 11, wherein said sensor is arranged to provide a position of said actuator ($N_1, N_2, \ldots, N_n$) in relation to a reference point.

13. The control system as claimed in claim 1, wherein said controller (2) is arranged to receive input signals from at least one external sensor.

14. The control system as claimed in claim 13, wherein said at least one external sensor comprises a sensor arranged to sense a weight of a user of said wheelchair.

15. The control system as claimed in claim 1, comprising a wheelchair operatively coupled to the control system and wherein said wheelchair further comprises an input device (3) connected to said controller (2).

16. The control system as claimed in claim 15, wherein said input device (3) is selected from a group of input devices consisting of a joystick, a keypad, or a touchpad.

17. The control system as claimed in claim 15, wherein said movable parts (31, 32, 33, 34, 35, 36) comprise at least one of a backrest, a seat, a headrest, armrests, leg rests, and foot rests.

18. A method of controlling a wheelchair having a number of movable parts (31, 32, 33, 34, 35, 36), a number of actuators ($N_1, N_2, \ldots, N_n$) located in connection with and enabling movement of said movable parts (31, 32, 33, 34, 35, 36), and a controller (2) for controlling movements of said actuators ($N_1, N_2, \ldots, N_n$), said method comprising steps of:

programming said controller (2) with a mathematical model of the kinematics of said movable parts (31, 32, 33, 34, 35, 36) and their respective at least one actuator ($N_1, N_2, \ldots, N_n$), said mathematical model being based on defining the structure of a wheelchair by a number of points, said points comprising locations of joint coupling points of said wheelchair, wherein mechanical relationships between, and kinematics of, different parts are translated into mathematical functions, determining an input value of one or more of said actuators ($N_1, N_2, \ldots, N_n$), setting, based on said mathematical model, limiting positions of said actuators ($N_1, N_2, \ldots, N_n$) in response to said determined input value.

19. The method as claimed in claim 18, wherein said controller 5 (2) handles an arbitrary number of input signals and an arbitrary number of output signals.

20. The method as claimed in claim 19, wherein said output signals are associated with an arbitrary number of constraints.

21. The method as claimed in claim 18, wherein said mathematical model defines positions and angles of the joints of said wheelchair.

*22. A control system for controlling a wheelchair having movable parts, said control system comprising:*

*one or more actuators for effectuating movements of said movable parts;*

*a controller comprising:*

*a mathematical model of the kinematics of said movable parts, said mathematical model being based on defining a structure of said wheelchair by a number of points, said number of points comprising locations of joint coupling points of said wheelchair,*

*wherein mechanical relationships between, and kinematics of, different parts are translated into mathematical functions,*

*wherein said controller receives an input signal from said one or more actuators,*

*and wherein said controller, based on said mathematical model, sets limiting positions of said actuators in response to said input signal, enabling dynamical alteration of a limiting position of at least one of said one or more actuators.*

*23. The control system of claim 22, wherein said actuators are located at joins of said wheelchair.*

*24. The control system of claim 22, wherein said controller is able to handle an arbitrary number of input signals and an arbitrary number of output signals.*

*25. The control system of claim 24, wherein said output signals are associated with an arbitrary number of constraints.*

*26. The control system of claim 22, wherein said controller is a master unit of a local interconnect network.*

*27. The control system of claim 22, wherein said actuators comprise electronic circuitry for receiving commands from said controller, thereby setting a dynamically alterable limiting position.*

*28. The control system of claim 22, wherein said controller comprises a memory.*

*29. The control system of claim 28, wherein said memory comprises a configuration file.*

*30. The control system of claim 29, wherein said configuration file comprises safety limits restricting a speed of said wheelchair when a criteria, as determined based on said input signal, is fulfilled.*

*31. The control system of claim 22, wherein said control system comprises an additional communication network.*

*32. The control system of claim 23, wherein one or more of said actuators comprises a sensor.*

*33. The control system of claim 32, wherein said sensor is arranged to provide a position of said actuator in relation to a reference point.*

*34. The control system of claim 22, wherein said controller is arranged to receive input signals from at least one external sensor.*

*35. The control system of claim 34, wherein said at least one external sensor comprises a sensor arranged to sense a weight of a user of said wheelchair.*

*36. The control system of claim 22, comprising a wheelchair operatively coupled to the control system and wherein said wheelchair further comprises an input device connected to said controller.*

*37. The control system of claim 36, wherein said input device is selected from a group of input devices consisting of: a joystick, a keypad, or a touchpad.*

*38. The control system of claim 36, wherein said movable parts comprise at least one of a backrest, a seat, a headrest, armrests, leg rests, and foot rests.*

*39. A method of controlling a wheelchair having a number of movable parts, a number of actuators located in connection with and enabling movement of said movable parts, and a controller for controlling movements of said actuators, said method comprising steps of:*

*programming said controller with a mathematical model of the kinematics of said movable parts and their respective at least one actuator, said mathematical model being based on defining the structure of a wheelchair by a number of points, said points comprising locations of joint coupling points of said wheelchair, wherein mechanical relationships between, and kinematics of, different parts are translated into mathematical functions,*

*determining an input value of one or more of said actuators,*

*dynamically setting, based on said mathematical model, limiting positions of said actuators in response to said determined input value.*

*40. The method of claim 39, wherein said controller handles an arbitrary number of input signals and an arbitrary number of output signals.*

*41. The method of claim 40, wherein said output signals are associated with an arbitrary number of constraints.*

*42. The method of claim 39, wherein said mathematical model defines positions and angles of the joints of said wheelchair.*

* * * * *